Aug. 18, 1953          J. A. SHIPES          2,649,168
          AUTOMATIC WEAR TAKE-UP MECHANISM FOR
          INTERNAL EXPANDING HYDRAULIC BRAKES
Filed Sept. 11, 1950                    2 Sheets-Sheet 1

John A. Shipes
INVENTOR.

Aug. 18, 1953   J. A. SHIPES   2,649,168
AUTOMATIC WEAR TAKE-UP MECHANISM FOR
INTERNAL EXPANDING HYDRAULIC BRAKES
Filed Sept. 11, 1950   2 Sheets-Sheet 2

John A. Shipes
INVENTOR.

Patented Aug. 18, 1953

2,649,168

UNITED STATES PATENT OFFICE 2,649,168

AUTOMATIC WEAR TAKE-UP MECHANISM FOR INTERNAL EXPANDING HYDRAULIC BRAKES

John A. Shipes, Charlotte, N. C.

Application September 11, 1950, Serial No. 184,268

5 Claims. (Cl. 188—79.5)

My invention relates to improvements in automatic wear take-up mechanism for internal expanding shoe type hydraulic brakes, of automobiles especially, although not necessarily.

The primary object of my invention is to provide in such brakes improved ratchet bar mechanism automatically operative to take up wear on the brakeshoes as an incident to engagement of the brakeshoes with the brake drum so as to maintain a uniform predetermined brake clearance when the brakeshoes are disengaged, and which is more efficient than similar mechanisms, simple in construction, easy to install and inexpensive to manufacture and service.

Other and subordinate objects, within the purview of my invention, together with the precise nature of my improvements will be readily understood when the succeeding description and claims are read with reference to the drawings accompanying and forming part of this specification.

Figure 1:
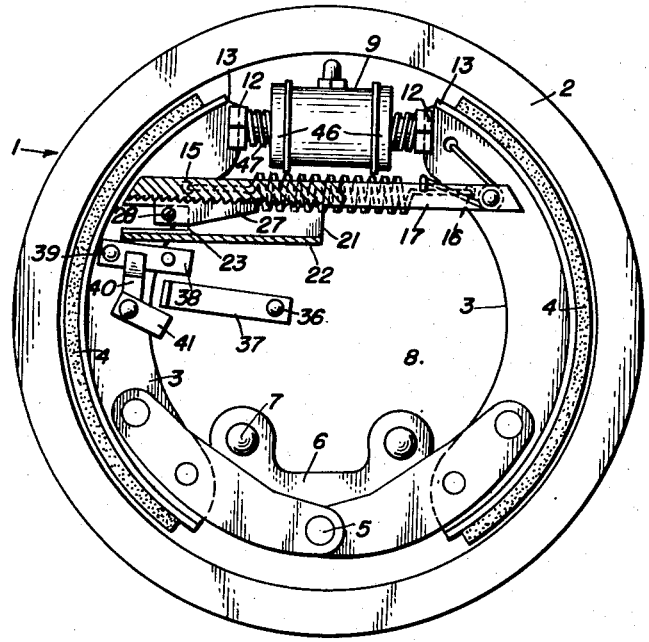
Figure 1 is a view in side elevation, partly in longitudinal section, of an internal expanding shoe-type hydraulic brake structure embodying my improved wear take-up mechanism, the position of the parts being illustrated as when the brakeshoes are disengaged and without wear on the same.

Referring to the drawings by numerals, 1 designates the conventional internal expanding shoe type hydraulic brake structure of an automobile, not shown, and including the usual rotary brake drum 2, the brakeshoes 3, lined, as at 4, and pivoted, as at 5, on a mounting 6, bolted as at 7, to the usual fixed back shoe carrying plate 8. The brakeshoes 3 are expanded in the usual manner by swinging the same into engagement with the brake drum 2 by hydraulic pressure in a brake cylinder 9 operating against the pistons 10 to separate the same, the pistons 10 having plungers 11 provided with grooved heads 12 straddling the free ends 13 of the brakeshoes 3.

The numeral 14 designates the conventional brake releasing spring connected to said shoes 3, as at 15, 16, to retract said shoes into brake disengaging position.

According to my invention, ratchet bar mechanism is provided for automatically taking up brake wear comprising an upper, relatively long, horizontal ratchet bar 17 carried by and pivoted at one end, as at 18, to one brakeshoe 3 for vertical swinging movement in overlapping adjacent relation to said shoes 3 contiguous the free ends 13 of said shoes. The ratchet bar 17 is provided with a bottom edge row of ratchet teeth 19 extending from its free end 20 a distance suitable for a purpose presently seen. A longitudinal hollow guide sleeve 21 of rectangular form in cross-section depends from said ratchet bar 17 below the row of teeth 19 and is formed integrally with said bar 17 with its bottom 22 parallel with said row of teeth 19 and a front end longitudinal slot 23 in said sleeve below said row of teeth 19 for a purpose presently seen. The row of teeth 19 extends along the top of the slot and through the top of the sleeve with the teeth countersunk in said bar 17. A U-shaped spring 24 is coiled around the pivot 18 of the ratchet bar 17 with its end suitably connected to said ratchet bar 17, as at 25, and to the brakeshoe, as at 26, carrying said bar 17, so as to tension said bar and urge the same downwardly. The ratchet bar 17, ratchet teeth 19, and guide sleeve 21 may be cast in one piece or otherwise suitably formed.

A lower, relatively shorter ratchet bar 27 is carried by the other brakeshoe 3 beneath said ratchet bar 17 and in the sleeve 21 and is pivoted adjacent one end, as at 28, on said other brakeshoe 3 for vertical swinging in said sleeve with upper edge ratchet teeth 29 complementing the row of ratchet teeth 19 for interlocking engagement therewith, as shown in Figure 1, to prevent retraction of the brakeshoes 3 into brake disengaging position beyond a selected degree of brake clearance provided as presently described.

Figure 2:
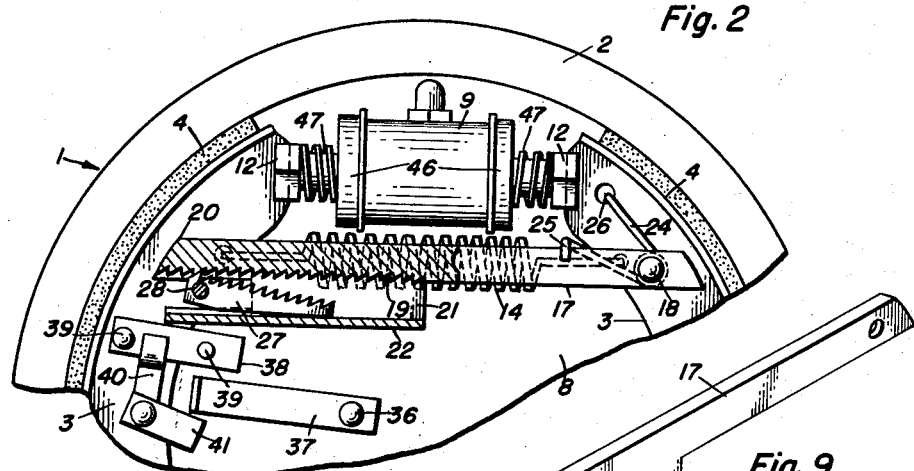
Figure 2 is a fragmentary enlarged view of the same illustrating the position of the parts when the brakeshoes are engaged.
Figure 9:
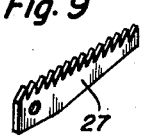
Figure 9 is a similar view of the lower, shorter ratchet bar.
Figure 8:
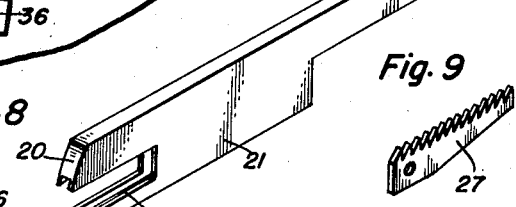
Figure 8 is an enlarged view in perspective of the longer, upper ratchet bar.
Figure 7:
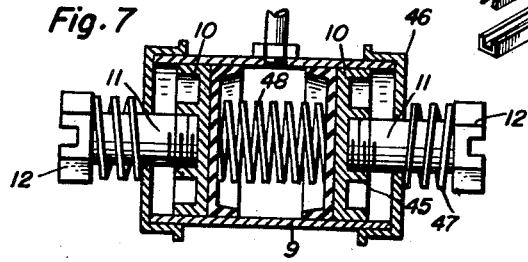
Figure 7 is an enlarged view in longitudinal section of the hydraulic brake cylinder.

Normally, that is, with the brakeshoes 3 disengaged, after predetermined clearance, the upper ratchet bar 17 under the tension of the spring 24 tends to bear downwardly against one end tooth 29 on one side of the pivot 28 of said ratchet bar 27, thereby swinging said ratchet bar 27 upwardly on the other side of its pivot into substantially parallel relation to the upper ratchet bar 17 so that all of the teeth 29 on said lower ratchet bar 27 engage teeth 19 on the upper ratchet bar 17 in interlocking engagement therewith to maintain the brake clearance. As will be clear, the ratchet bars 17, 27 are endwise adjustable longitudinally, relatively, upon engaging movement of the brakeshoes 3. However, upon such endwise movement of said ratchet bars 17, 27, the ratchet bar 27, by frictional engagement of the ratchet teeth 19 with said end tooth 29 on the lower ratchet bar 27, swings the lower ratchet bar 27 downwardly, as shown in Figure 2, into inclined position so that said end tooth 29, only, is positioned to interlock with teeth 19. This swinging movement of the lower ratchet bar 27 compensates for longitudinal adjustment of said ratchet bars, relatively, during engaging movement of the brakeshoes 3 and is limited by the bottom 22 of sleeve 21.

Figure 5:
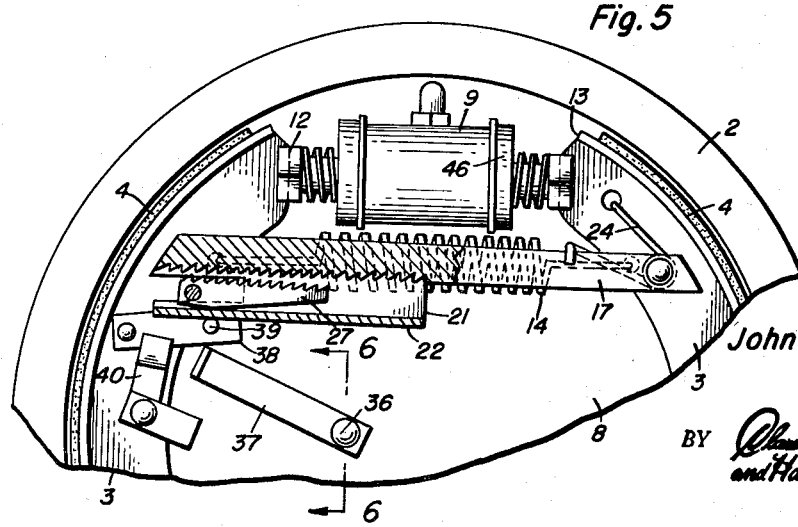
Figure 5 is another similar view illustrating the wear take-up mechanism disconnected preparatory to presetting the same for a desired clearance.

Means are provided for swinging the upper ratchet bar 17 clear of the lower ratchet bar 27 into tooth disengaging position comprising the following:

A wrench hold member 35 is fixed on the outer end of a rock shaft 36 extending through the back plate 8 into the brake drum 2 and journaled in said plate 8 beneath the sleeve 22. A crank 37 is fixed on the inner end of said rock shaft 36 inside the brake drum 2 for upward swinging by rocking of said rock shaft 36 in one direction whereby to engage and swing upwardly a lever 38 pivoted, as at 39, on the brakeshoe sleeve carrying the lower ratchet bar 27. Upward swinging of the lever 38 engages a lateral pin 39 thereon with the bottom 22 of the sleeve 21 to swing the upper ratchet bar 17 upwardly and disengage the ratchet teeth 19 from the ratchet teeth 29. Such movement of the upper ratchet bar 17 engages the bottom 22 of the sleeve 21 with the lower ratchet bar 27 and swings said bar 27 into horizontal position, all as shown in Figure 5. A stop 40 on the brakeshoe 3 on which the lever 38 is pivoted limits downward swinging of said lever 38, and another stop 41 on said brakeshoe 3 limits downward swinging of the crank 37. A suitably arranged coil spring 42 on the rock shaft 36 normally rocks said rock shaft in a direction to swing the crank 37 downwardly against its stop 37. After the ratchet bar mechanism is disengaged, as above described, and with the brakeshoes 3 disengaged, the upper ratchet bar 17 may be lowered from its upswung position to engage its ratchet teeth 19 with the ratchet teeth 29 with the beforementioned end tooth 29 engaging a selected ratchet tooth 19, whereby to predetermine the degree of brake clearance with the new brake lining 4, as shown in Fig. 1. The slot 23 provides for using a tool on bar 27 in this operation.

Referring now to the operation of my invention as so far described, with the brake clearance predetermined for a new brake lining 4, in the manner above described, engaging movement of the brakeshoes 3 will cause the upper ratchet bar 17 to move endwise relative to the lower ratchet bar 27 to swing said bar 27 into the described inclined position with one end tooth 29 engaged with one tooth 19 of the upper ratchet bar 17.

Figure 3:
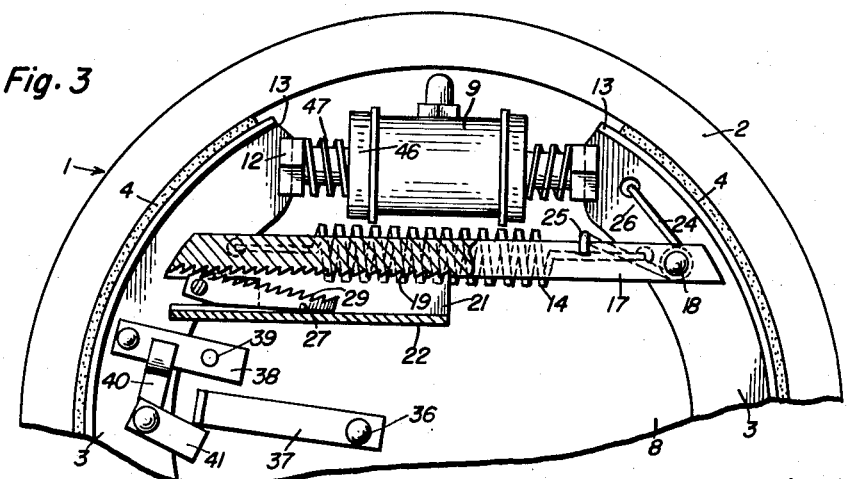
Figure 3 is a view similar to Figure 2 illustrating the manner in which my improved mechanism takes up wear as an incident to engagement of the brakeshoes.
Figure 6:
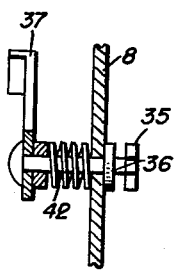
Figure 6 is a detail enlarged view in vertical section taken on the line 6—6 of Figure 5.
Figure 4:
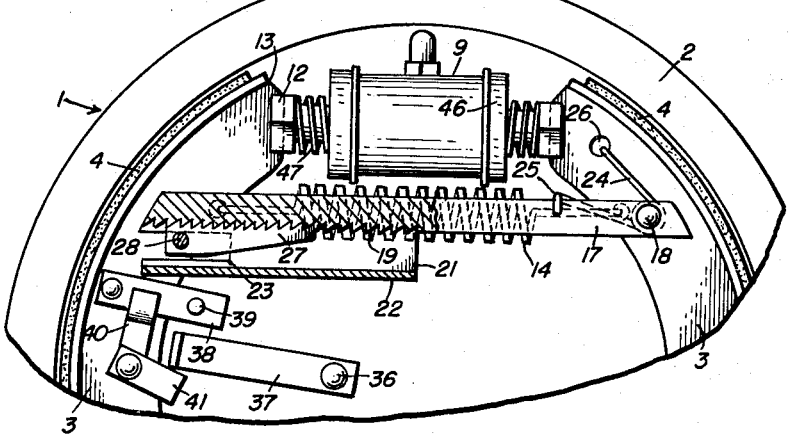
Figure 4 is a similar view illustrating the position of the parts when the brakeshoes are disengaged after a wear take-up operation.

Now, when the brakeshoes 3 are disengaged, and the lining 4 not worn, the lower ratchet bar 27 will be swung into parallel relation to the upper ratchet bar 17, in the manner previously described, to interlock the ratchet teeth 19 and 20 and maintain the predetermined brake clearance, as will be clear. However, as soon as the brake lining 4 wears in degree greater than the spacing between the ratchet teeth 19, 29, the upper and lower ratchet bars 17, 27, as an incident to engaging movement of the brakeshoes 3, will be moved longitudinally endwise, relatively, so that the tooth 19 engaging the end tooth 29 on the lower ratchet bar 27 will ratchet over said end tooth and position a succeeding tooth 19 into engagement with said end tooth 29, all as shown in Figure 3. This will cause longitudinal adjustment of the ratchet bars 17, 27 in correspondence with the degree of lining wear to take up such wear and so that retraction of the brakeshoes 3 into brake disengaging position will be limited in correspondence with the degree of wear to maintain the predetermined brake clearance. This relative longitudinal adjustment of the ratchet bars 17, 27 will occur each time a sufficient degree of wear has occurred on the brake linings 4, and, as will be clear, the ratchet teeth 19, 29 may be spaced to take up as little as four-thousandths of an inch of wear at a time.

It is to be noted that the degree of brake clearance established by the described operation of the ratchet bars 17, 21 may be varied, that is, increased, or diminished, by varying the degree of downward swinging movement of the lower ratchet bar 27, as by using upper ratchet bars 17 having sleeves 21 of different depths internally to variably limit downward swinging of said bar 27. Thus, with the proper spacing between ratchet teeth 19, 29, the mechanism may be preset for brake clearance of such slight degree as twenty-five thousandths of an inch.

In addition to the foregoing, the hydraulic cylinder 9 is rendered dust proof, as follows. The plungers 11 are threaded into sockets 45 in the pistons 10 and slidably extend through dust caps 46 fitted over the ends of the cylinder 9. Coil springs 47 on the plungers 11, between said caps and the grooved heads 12, maintain said caps 46 tight against the ends of said cylinder 9. The numeral 48 designates the conventional cushioned spring between the pistons 10, which need merely be identified in passing.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

Having described the invention, what is claimed as new is:

1. An internal expanding brake comprising a pair of pivoted brakeshoes movable into brake engaging and disengaging positions, respectively, a pair of relatively long and short ratchet toothed bars each pivoted adjacent one end on an associated brakeshoe for swinging movement thereon with the ratchet teeth of said bars facing, spring means pressing the longer bar against the shorter bar to normally swing said shorter bar parallel with the longer bar for interlocking of the teeth of said bars when said shoes are disengaged to limit disengaging movement of said shoes and establish the degree of brake clearance, said bars being longitudinally adjustable oppositely by engaging movement of said shoes and with a tooth of the longer bar frictionally engaging one tooth of the shorter bar at one side of its pivot to swing said shorter bar in one direction, such swinging of said shorter bar compensating for longitudinal adjustment of said bars with said one tooth interlocked with teeth of the longer bar, means limiting such swinging of said shorter bar to cause the longer bar to ratchet over said one tooth and automatically vary the position of said bars longitudinally whereby to take up wear on the shoes when said shoes are disengaged, and means to swing said longer bar clear of said shorter bar into tooth disengaging position for manual setting to engage said teeth in different longitudinal positions of said bars for predetermining the brake clearance.

2. An internal expanding brake according to claim 1 wherein said second-named means comprises a stop member on said longer bar engaged by said shorter bar.

3. An internal expanding brake according to claim 1 wherein said second named means comprises a longitudinal sleeve on said longer bar in which said shorter bar swings into engagement therewith.

4. An internal expanding brake according to claim 1 said last-named means comprising a rock shaft and a crank on said shaft, and a pivoted lever operative by said crank for swinging said upper bar.

5. An internal expanding brake comprising a pair of pivoted brakeshoes movable into brake engaging and disengaging positions, respectively, a pair of relatively long and short ratchet toothed bars each pivoted adjacent one end on an associated brakeshoe for swinging movement thereon with the ratchet teeth of said bars facing, spring means pressing the longer bar against the shorter bar to normally swing said shorter bar parallel with the longer bar for interlocking of the teeth of said bars when said shoes are disengaged to limit disengaging movement of said shoes and establish the degree of brake clearance, said bars being longitudinally adjustable oppositely by engaging movement of said shoes and with a tooth of the longer bar frictionally engaging one tooth of the shorter bar at one side of its pivot to swing said shorter bar compensating for longitudinal adjustment of said bars with said one tooth interlocked with teeth of the longer bar, means limiting such swinging of said shorter bar to cause the longer bar to ratchet over said one tooth and automatically vary the position of said bars longitudinally whereby to take up wear on the shoes when said shoes are disengaged.

JOHN A. SHIPES.

References Cited in the file of this patent

UNITED STATES PATENTS

| Number | Name | Date |
|---|---|---|
| 2,087,196 | Tarbox | July 13, 1937 |
| 2,303,699 | Main | Dec. 1, 1942 |
| 2,322,492 | Williams | June 22, 1943 |
| 2,522,181 | Krikorian | Sept. 12, 1950 |